United States Patent [19]
Schmudde et al.

[11] Patent Number: 5,851,082
[45] Date of Patent: Dec. 22, 1998

[54] AXIAL BALL-AND-SOCKET JOINT FOR LINKAGES IN MOTOR VEHICLES

[75] Inventors: Norbert Schmudde, Osnabruck; Martin Wellerding, Damme, both of Germany

[73] Assignee: Lemförder Metallwaren AG, Stemwede-Dielingen, Germany

[21] Appl. No.: 776,068
[22] PCT Filed: May 31, 1996
[86] PCT No.: PCT/EP96/02364
§ 371 Date: Jan. 7, 1997
§ 102(e) Date: Jan. 7, 1997
[87] PCT Pub. No.: WO96/41961
PCT Pub. Date: Dec. 27, 1996

[30] Foreign Application Priority Data

Jun. 10, 1995 [DE] Germany ............ 295 09 566.0

[51] Int. Cl.⁶ .................................................. F16C 11/00
[52] U.S. Cl. ........................ 403/133; 403/122; 403/132
[58] Field of Search .................... 403/133, 132, 403/131, 122

[56] References Cited

U.S. PATENT DOCUMENTS

| | | | |
|---|---|---|---|
| 4,225,260 | 9/1980 | Gaines | 403/114 |
| 4,353,660 | 10/1982 | Parks | 403/132 |
| 4,995,755 | 2/1991 | Hyodo et al. | 403/133 |
| 5,188,477 | 2/1993 | Idosako et al. | 403/133 |

FOREIGN PATENT DOCUMENTS

| | | |
|---|---|---|
| 1330792 | 12/1963 | France . |
| 1378647 | 2/1965 | France . |
| 1113336 | 8/1961 | Germany . |
| 43 05 994 | 9/1993 | Germany . |
| 0090713 | 7/1980 | Japan . |

*Primary Examiner*—Kenneth J. Dorner
*Assistant Examiner*—William L. Miller
*Attorney, Agent, or Firm*—McGlew and Tuttle

[57] ABSTRACT

An axial ball-and-socket joint for linkages in motor vehicles, comprising a metallic housing, which is open on one side and has a fastening pin opposite the open side of the housing. A likewise metallic joint ball, which is mounted in it in a bearing shell made of plastic and is provided at the end of a ball pivot. The ball pivot projects from the open side of the housing coaxially with the fastening pin, wherein the joint ball is held in the housing by deformation of the material of the open edge of the housing. The bearing shell made of plastic is supported on the housing side with the fastening pin with an oblique surface against an oblique surface on the housing and against a buffer made of a material having selected elastic characteristics, which is inserted between the bearing shell and a radial support surface provided on the housing.

9 Claims, 1 Drawing Sheet

AXIAL BALL-AND-SOCKET JOINT FOR LINKAGES IN MOTOR VEHICLES

FIELD OF THE INVENTION

The present invention pertains to an axial ball-and-socket joint for linkages in motor vehicles comprising a metallic housing, which is open on one side and which has a fastening pin opposite the open side of the housing, and a likewise metallic joint ball, which is mounted in it in a bearing shell made of plastic and is provided at the end of a ball pivot, which projects from the open side of the housing coaxially with the fastening pin, wherein the said joint ball is held in the housing by material deformation.

BACKGROUND OF THE INVENTION

Axial ball-and-socket joints having these design features are used in very large numbers in motor vehicles. They are subject to natural wear as well as natural aging, and they often operate under different temperature and weather conditions. This leads to undesired joint clearances.

SUMMARY AND OBJECTS OF THE INVENTION

The basic object of the present invention is to avoid the development of joint clearance by design measures related to the joint.

According to the invention, an axial ball-and-socket joint for linkages in motor vehicles is provided including a metallic housing, which is open on one side and which has a fastening pin opposite the open side of the housing, and a likewise metallic joint ball, which is mounted in the housing in a bearing shell made of plastic. The joint ball is provided at the end of a ball pivot, which projects from the open side of the housing and may be positioned coaxially with the fastening pin. The said joint ball is held in the housing by material deformation. The bearing shell made of plastic is supported on the housing side with the fastening pin with an oblique surface against an oblique surface on the housing and against a buffer made of a material having selected elastic characteristics. The elastic buffer is inserted between the bearing shell and a radial support surface provided on the housing.

The elastic buffer preferably consists of a rubber ring of a sufficient elastic material stiffness. The radial support surface and a cylindrical inner wall area of the housing preferably pass over (transition) into each other with a flute or fluted region. The rubber ring is preferably arranged in the flute or fluted region. The flute or fluted region on the inside of the housing and the oblique surface at the bearing shell preferably form a cavity accommodating the rubber ring.

An axial ball-and-socket joint having these design features is mounted with slight pretension during the closing of the housing by deforming the material of the open edge of the housing. The oblique surfaces at the bearing shell and in the housing advantageously form an angle of about 45° with the longitudinal axis of the axial joint. Movements of the parts of the axial ball-and-socket joint caused by changes in heat (expansions and shrinkages) are compensated by the pretension. However, the same design features also compensate bearing dimensions as a consequence of a natural wear or a natural aging. The buffer inserted between the bearing shell and the housing preferably consists of a rubber ring having a selected elastic material stiffness. High temperature resistance and low compressive set of the rubber ring can be readily achieved by judiciously selecting the material. The temperature resistance of the rubber blend should preferably reach about 140° C. Due to the design features according to the present invention, the bearing shell has the possibility of expanding freely and without pretension during changes in temperature. No free bearing clearance is formed as a consequence of the automatic adjustment during natural wear or natural aging. The service life of an axial ball-and-socket joint having the new design features is increased.

The radial support surface and a cylindrical inner wall area on the inside of the housing preferably pass over into each other with a flute, and this flute accommodates the rubber ring which forms the elastic buffer. This flute on the inside of the housing and the oblique surface on the outside of the bearing shell enclose a cavity, in which the rubber ring is arranged. An improvement in the automatic adjustment properties of the axial ball-and-socket joint is thus achieved. Defined stops should preferably be provided in order to prevent damage to the adjusting elements from occurring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
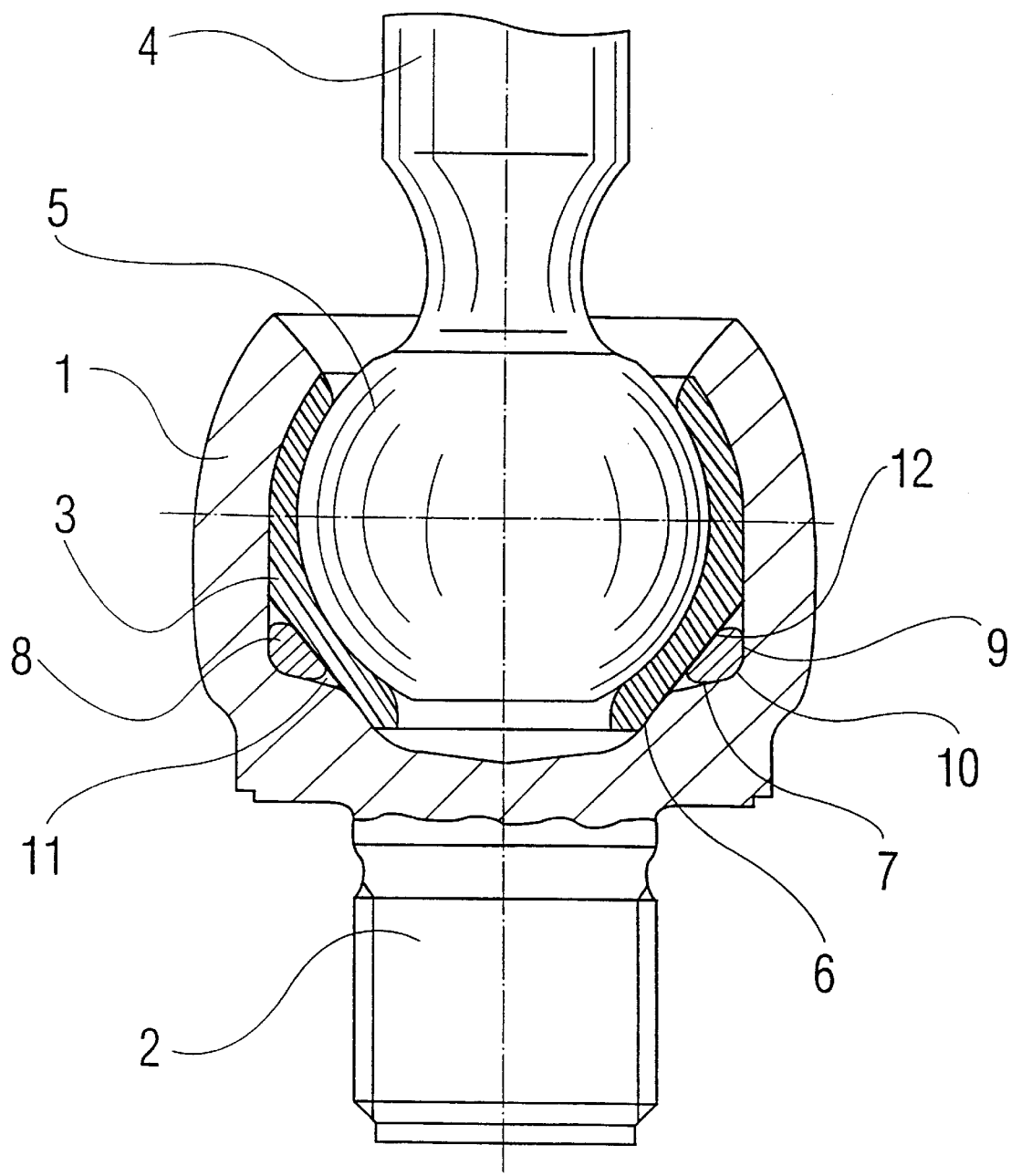
FIG. 1 is a sectional view of an exemplary embodiment of the present invention in an axial plane.

Referring to FIG. 1 in particular, the axial ball-and-socket joint of the invention comprises the metallic housing 1, which is open on one side, with a fastening pin 2 made in one piece opposite the free housing side and with a likewise metallic joint ball 5, which is mounted in it in a bearing shell 3 made of plastic and is provided at the end of a ball pivot 4, which projects from the open side of the housing 1 coaxially with the fastening pin 2. The latter the joint ball is held in the housing 1 by an inwardly bent deformation of the open housing edge. The bearing shell 3 is supported within the housing 1 on the side of the fastening pin 2 with an oblique surface 12 against a corresponding oblique surface 6 on the inside of the housing 1. An elastic buffer made of a material having selected elastic characteristics is arranged between the bearing shell 3 and an approximately radially extending support surface 7 on the inside of the housing 1. This elastic buffer consists of a rubber ring 8 having a selected elastic material stiffness in the example. The radial support surface 7 and a cylindrical inner wall area 9 pass over into each other with a flute 10, wherein the rubber ring 8 is supported in this flute, on the one hand, and against the oblique surface 12 at the bearing shell 3, on the other hand. The oblique surface 12 of at the bearing shell 3 and the flute 10 on the inside of the housing form a cavity 11, in which the rubber ring 8 is arranged.

While a specific embodiment of the invention has been shown and described in detail to illustrate the application of the principles of the invention, it will be understood that the invention may be embodied otherwise without departing from such principles.

We claim:

1. An axial ball-and-socket joint for linkages in motor vehicles, comprising:

a metallic housing, which is open on one side and which has a fastening pin opposite the open side of the housing; said fastening pin having a longitudinal axis;

a bearing shell made of plastic disposed in said housing;

a metallic joint ball, which is mounted in said housing in said bearing shell, said joint ball being provided at an end of a ball pivot, said ball pivot projecting from the open side of said housing and being positionable coaxially with the fastening pins, said joint ball being held in said housing by material deformation; and a rubber buffer having selected elastic characteristics, said bearing shell having a bearing shell oblique surface with respect to said longitudinal axis, said bearing shell oblique surface having a constant angle, said bearing shell oblique surface being supported, on a side of said housing with said fastening pin, against an oblique surface on said housing and said bearing shell oblique surface being supported against said buffer, said buffer being inserted between said bearing shell and a radial support surface provided on said housing.

2. An axial ball-and-socket joint in accordance with claim 1, wherein said elastic buffer consists of a rubber ring with elastic material stiffness, said rubber ring having a cross sections, said cross section being circular in a nondeformed state and being non circular in a deformed state, said rubber ring being disposed in a deformed state between said bearing shell and said radial support surface with an outer contour surface in contact with and conforming to said bearing shell and with an outer contour surface in contact with and conforming to said radial support surface.

3. An axial ball-and-socket joint in accordance with claim 2, wherein said radial support surface and a cylindrical inner wall area pass over into each other with a flute, and said rubber ring is arranged in said flute.

4. An axial ball-and-socket joint in accordance with claim 3, wherein said flute on said inner surface of said housing, and said oblique surface at said bearing shell form a cavity accommodating said rubber ring.

5. An axial ball-and-socket joint for linkages in motor vehicles, comprising:

a metallic housing, which is open on one side and which has a fastening pin opposite the open side of the housing, said housing having an inner surface; said fastening pin having a longitudinal axis;

a bearing shell made of plastic disposed in said housing, said bearing shell having a bearing shell oblique surface with respect to said longitudinal axis and with a constant angle, said bearing shell oblique surface being supported by an oblique portion of said inner surface adjacent to a fastening pin end of said housing, said housing having a radial support surface provided adjacent to said oblique portion of said inner surface;

a metallic joint ball, which is mounted in said housing in said bearing shell, said joint ball being provided at an end of a ball pivot, said ball pivot projecting from the open side of said housing and being positionable coaxially with the fastening pin, said joint ball being held in said housing by material deformation of said housing; and an elastic rubber buffer, said rubber buffer being inserted between said bearing shell and said radial support surface and being initially compressed whereby an elastic restoring force moves said bearing shell relative to said housing upon wear of either said bearing shell or said metallic ball joint, said rubber ring having a cross section in a nondeformed state and having a different said cross section in a deformed state and being disposed in a deformed state between said bearing shell and said radial support surface with an outer contour surface in contact with and conforming to said bearing shell oblique surface and with an outer contour surface in contact with and conforming to said radial support surface.

6. An axial ball-and-socket joint in accordance with claim 5, wherein said elastic buffer comprises a rubber ring with elastic material stiffness and said cross section is circular and said different cross section is non circular.

7. An axial ball-and-socket joint in accordance with claim 5, wherein said inner surface includes a cylindrical inner wall area, and a transitional portion between said radial support surface and said cylindrical inner wall area, said transitional portion including a fluted region, and said rubber ring is arranged in said fluted region.

8. An axial ball-and-socket joint in accordance with claim 7, wherein said fluted region on said inner surface of said housing and said oblique surface at said bearing shell form a cavity accommodating said rubber ring.

9. An axial ball-and-socket joint for linkages in motor vehicles, comprising:

a metallic housing, which is open on one side and which has a fastening pin opposite the open side of the housing, said fastening pin having a longitudinal axis, said housing having an inner surface including a cylindrical inner wall area, and a transitional portion between a radial support surface and said cylindrical inner wall area, said transitional portion including a fluted region;

a bearing shell made of plastic disposed in said housing, said bearing shell having a bearing shell oblique surface with respect to said longitudinal axis and with a constant angle, said bearing shell oblique surface being supported by and in contact with an oblique portion of said inner surface adjacent to a fastening pin end of said housing, said housing having said radial support surface provided adjacent to said oblique portion of said inner surface;

a metallic joint ball, which is mounted in said housing in said bearing shell, said joint ball being provided at an end of a ball pivot, said ball pivot projecting from the open side of said housing and being positionable coaxially with the fastening pin, said joint ball being held in said housing by material deformation of said housing; and an elastic buffer rubber ring, said rubber ring being arranged in said fluted region and being inserted between said bearing shell and said radial support surface and being initially compressed and provided in a deformed state generating an elastic restoring force acting on said bearing shell relative to said housing for moving said bearing shell relative to said housing upon wear of either of said bearing shell and said metallic ball joint, said rubber ring having a circular cross section in a nondeformed state and having a non circular said cross section in said deformed state and being disposed in a deformed state between said bearing shell and said radial support surface with an outer contour surface in contact with and conforming to said bearing shell oblique surface and with an outer contour surface in contact with and conforming to said fluted region of said radial support surface, said bearing shell being continuously in direct contact with said oblique surface of said housing and with said cylindrical inner wall area, to provide contact between said bearing shell and said housing on each side of said radial support surface.

* * * * *